Figure 1:
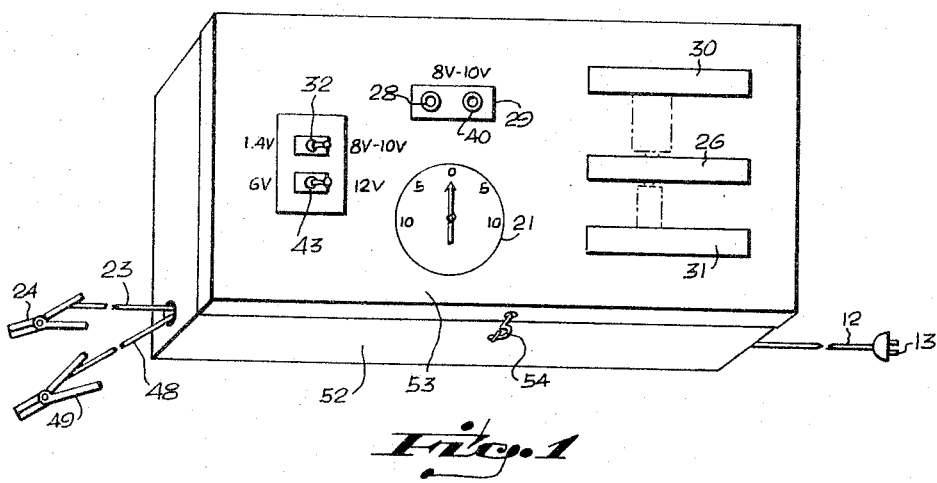

Feb. 28, 1967   E. T. LYON   3,307,096
MULTI-PURPOSE BATTERY CHARGER
Filed May 19, 1964

INVENTOR.
EMORY TAYLOR LYON
BY

United States Patent Office 3,307,096
Patented Feb. 28, 1967

3,307,096
MULTI-PURPOSE BATTERY CHARGER
Emory Taylor Lyon, 107 Liberty St.,
Ridgewood, N.J. 07450
Filed May 19, 1964, Ser. No. 368,638
3 Claims. (Cl. 320—15)

My invention relates to battery chargers and is directed particularly to an improved battery charger for recharging or rejuvenating all types of wet cells and batteries, including automobile storage batteries, AA, C and D type flashlight, photoflash and energizer cells, and B batteries for transistor radios, hearing aids and the like.

While many types of multi-purpose battery chargers have heretofore been devised, none has achieved commercial success or been widely accepted by the general public for many reasons, principal among which are their high cost, their limitations in portability and use, and their complexity.

It is accordingly among the principal objects of my invention to provide a battery and cell charger that is inexpensive to manufacture, light-weight and compact in structure, and multi-purpose in use.

Another object is to provide a multi-purpose battery charger of the character described which operates on household electric current and which is economical in power consumption.

Still another object is to provide a battery charger of the above nature which is attractive in appearance, and fool-proof and durable in operation.

Figure 2:
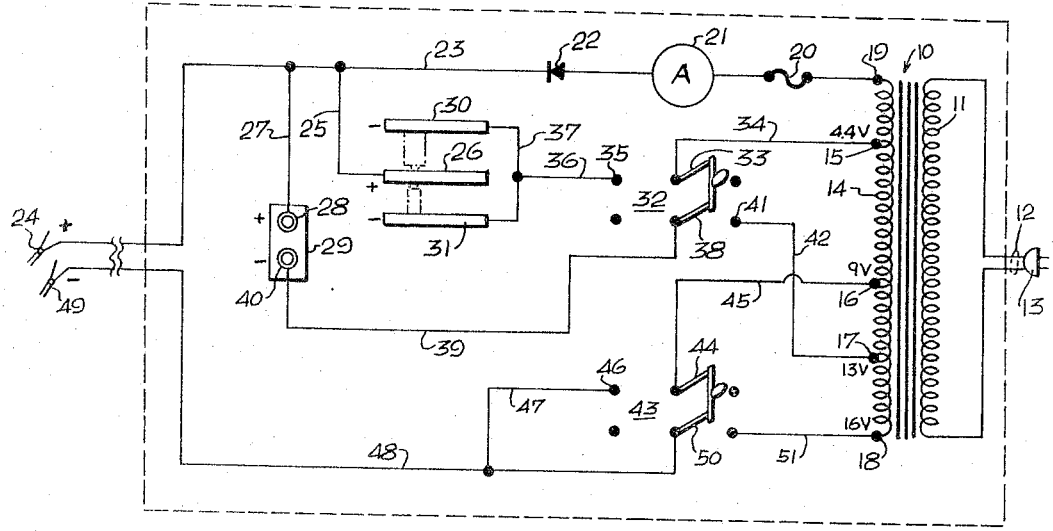

Other objects, features and advantages of my invention will be apparent from the following description when read with reference to the accompanying drawings. In the drawings, wherein like reference numerals denote corresponding parts throughout the several views;

FIG. 1 is a perspective view of a multi-purpose battery charger embodying the invention, and FIG. 2 is a schematic diagram of the electrical circuit thereof.

Referring now in detail to the drawings, and considering first the electrical circuit of FIG. 2, 10 designates a voltage step-down transformer having a primary winding 11 connected with a line cord 12 terminating in a receptacle plug 13 for plug-in connection with an ordinary 120 volt alternating current household electrical receptacle. The transformer secondary winding 14 is tapped at terminal points 15, 16, 17 and 18 which provide A.C. potentials of 4.4 v., 13 v., 9 v., and 16 v., respectively, with respect to the common secondary winding terminal 19. The common secondary winding terminal 19 is connected in series with a fuse 20 and ammeter 21 to the negative terminal of a half-wave rectifier 22, preferably a 15 ampere silicon rectifier. The positive terminal of the rectifier 22 connects, through conductor 23, to a battery clip 24, which is utilized when charging 6 or 12 volt vehicle storage batteries, as is hereinbelow explained. The positive terminal of the rectifier 22 also connects, through conductors 23 and 25, with the central or positive charging bar 26, used when charging dry cells, and, through conductors 23 and 27, to the positive snap connector terminal 28 of a battery clip 29 for charging 8–9 v. B batteries, as hereinbelow more fully explained.

Switch means are provided for establishing circuit connection for selective use of either the cell charger bars 26, 30 and 31 for charging 1½ volt cells, or the battery clip 29 for charging transistor type B batteries. To this end, a double-pole double-throw switch 32 is provided, said switch having one moveable arm 33 connected by conductor 34 to the 4.4 v. transformer secondary winding terminal 15, and a corresponding fixed terminal 35 at one side connected to conductors 36 and 37 to the negative terminal charger bars 30, 31. The other moveable arm 38 of the switch 32 connects, by conductor 39, to the negative terminal snap 40 of the B battery clip 29, and the corresponding fixed terminal 41 at the other side of the swtich is connected, through conductor 42 to the 13 v. transformer secondary winding terminal 17. Thus, when the switch 32 is thrown from its neutral position to the left as illustrated in FIG. 2, electrical connection is made from the 4.4 v. terminal 15 of the transformer secondary to the negative cell charger bars 30, 31 through said switch and conductors 34, 36 and 37; and when said switch is thrown to the right, electrical connection is established, through the switch and conductors 39 and 42, to the negative terminal snap 40 of the B battery clip 29.

Switch means is also provided for establishing circuit connection to the battery clips for charging either 6 volt (three cell) or 12 volt (six cell) storage batteries. For this purpose, a second double-pole double-throw switch 43 is utilized, one moveable arm 44 of which is connected, as by conductor 45, to the 9 v. terminal 16 of the transformer secondary winding 14, and the corresponding fixed terminal 46 at one side of which is connected, through conductors 47 and 48, to the negative battery clip 49. The other moveable arm 50 also connects, through conductor 48, to the negative battery clip 49, and its corresponding fixed terminal at the other side of the switch is connected through conductor 51 to the 16 v. terminal 18 of said secondary winding. Thus, when the switch 43 is thrown from its neutral position to the left, as illustrated in FIG. 2, electrical connection is established from the 9 v. terminal 16 of the transformer secondary to the negative battery clip 49 through said switch and conductors 45, 47 and 48; and when said switch is thrown to the right, electrical connection is established from the 16 v. terminal 18 of said transformer secondary to said negative battery clip 49 through said switch and conductors 48 and 51.

As illustrated in FIG. 1, the circuit components are compactly housed in a box 52, preferably of metal, having a hinged cover 53 which may be secured in closed position as by a hook 54. The switches 32 and 43, the battery clip 29, the bars 26, 30, and 31 and the ammeter 21 are mounted in the cover 53. The battery clip conductors 23, 48 extend through an opening in one side of the box 52 and are of sufficient length for convenient connection to the storage battery of a vehicle. The line cord 12 extends through an opening at the other side of the box 52 for connection with a household electrical outlet.

In use of the multi-purpose battery charger for charging dry cells, the cells will be placed between the charger bars 26, 30, and 31, as illustrated by the broken line representation of such cells in FIG. 1. As illustrated, the bars are so spaced that the smaller cells (type AA and C) will fit between the bars 26 and 31 with the positive cells terminals (button end) in contact with the central bar 26, and the larger cells (type D) will fit between the bars 26 and 30, also with the positive cell terminal in contact with the central bar 26. Although only two cells are shown in position for charging in FIG. 1, it will be understood that several cells of each type can be placed side-by-side for simultaneous charging. After plugging in the charger, the switch 32 will be moved from neutral position to the left, the position marked 1.4 v. in FIG. 1, for supplying approximately 1.4 v. direct current potential between the bars 26 and 30, and between bars 26 and 31. The cells will be substantially fully charged in from 3 to 5 minutes, depending upon their state of depletion prior to the charge.

In order to charge B type batteries, the battery will be clipped into the battery clip or receptacle 29 and the switch 32 moved to the right, the position marked 8 v.—10 v. in FIG. 1, for supplying approximately 9 v. direct current potential to the battery terminals. Charging time for B type batteries is approximately 6 to 8 hours, depending upon the condition of the battery.

In use of the multi-purpose charger for charging vehicle storage batteries, the clip 24 will be connected to the positive battery terminal and the clip 49 to the negative terminal. The switch 43 will then be switched from neutral position either to the left (6 v. position) if the battery to be charged is a three cell battery, or to the right (12 v. position) if the battery to be charged is a six cell battery. Recharging time is about an hour, but should not continue beyond the point where the specific gravity of the electrolyte is 1.250, or not to the point of excessive gassing.

It is to be noted that the capacity and construction of the charger is such that dry cells or batteries and vehicle storage cells can be charged at the same time, if desired.

While I have illustrated and described herein only one form in which my invention may conveniently be embodied in practice, this form is presented by way of example only and not in a limiting sense. The invention, in brief, comprises all the embodiments and modifications coming within the scope and spirit of the following claims.

What I claim as new and desire to secure by Letters Patent is:

1. In a multi-purpose battery charger, the combination comprising: circuit means for converting a household alternating current electric supply service to a plurality of different direct current potentials, receptacle means for receiving dry cells for charging, a clip receptacle for receiving B batteries for charging, first switch means for connecting said receptacle means and said clip receptacle, selectively, with one each of two of said plurality of different direct current potentials, said receptacle means comprising three metal bars arranged in spaced parallel relationship, the spacing between the center bar and an outer one of said bars being such as to accommodate D type dry cells, and the spacing between said center bar and the other outer one of said bars being such as to accommodate C type dry cells, said center bar being selectively connectable with the positive terminal of its respective direct current potential, said outer bars being selectively connectable with the negative terminal thereof, and a pair of storage battery clips, and second switch means for connecting said storage battery clips, selectively, with two others of said plurality of different direct current potentials for the selective charging of three cell or six cell vehicle storage batteries.

2. A multi-purpose battery charger as defined in claim 1 wherein said converting means comprises a voltage step-down transformer having a secondary winding tapped at a plurality of points corresponding to a said plurality of different direct current potentials, and a silicon rectifier in said circuit.

3. A multi-purpose battery charger as defined in claim 2 including a rectangular metal box containing said transformer, said rectifier and said switches, and said clip receptacle and said bars being mounted in the upper panel of said box.

References Cited by the Examiner
UNITED STATES PATENTS

| | | | |
|---|---|---|---|
| 1,570,499 | 1/1926 | Keane | 320—57 X |
| 1,782,558 | 11/1930 | Williams | 307—38 |
| 2,980,842 | 4/1961 | Medlar | 320—15 X |
| 3,209,230 | 7/1965 | Mas | 320—2 |

JOHN F. COUCH, *Primary Examiner.*

S. WEINBERG, *Assistant Examiner.*